Patented Jan. 10, 1939

2,142,987

UNITED STATES PATENT OFFICE 2,142,987

RECOVERY OF SULPHUR DIOXIDE FROM GASES

Raymond F. Bacon, Bronxville, and Rocco Fanelli, New Rochelle, N. Y.; said Fanelli assignor to said Bacon No Drawing. Application December 24, 1935, Serial No. 55,986

3 Claims. (Cl. 23—178)

This invention relates to the recovery of sulphur dioxide and has for an object the provision of an improved process for recovering sulphur dioxide from gases containing sulphur dioxide mixed with other gases. The process of the invention may be employed for the recovery of sulphur dioxide from gas mixtures containing sulphur dioxide in any degree of concentration, and it is particularly suitable for the treatment of gas mixtures containing relatively small concentrations of sulphur dioxide such, for example, as gas mixtures resulting from the roasting of pyrites and other sulphide ores, concentrates and other metallurgical raw materials and products containing metal sulphides.

The process of the invention may be employed to produce a substantially pure sulphur dioxide product, in either gaseous or liquid form, or to produce gaseous products containing sulphur dioxide in any suitable proportions. The invention provides an effective and economical method for producing sulphur dioxide-bearing reagents for various chemical and metallurgical uses as, for example, in the production of sulphuric acid, in the production of sulphite cooking liquors, in the production of elemental sulphur by reduction of the sulphur dioxide, in refrigeration and in the leaching of ores. The invention further provides an effective and economical method of reducing or eliminating the injurious effects resulting from discharging roaster and other smelter gases into the atmosphere, and, at the same time, permits the recovery in useful form of an important component of such injurious gases.

The process of the invention is of the type in which gases containing sulphur dioxide are treated with a liquid solvent or absorbent, and the absorbed sulphur dioxide is expelled by heating or by reduction of pressure with or without heating, the regenerated solvent or absorbent being used for the treatment of additional quantities of gases.

We have discovered that aqueous solutions of salts of weak acids capable of reacting with sulphurous acid to produce corresponding sulphites may be employed effectively in the recovery of sulphur dioxide from mixtures of gases containing the same. During the course of the absorption operation in which sulphite is formed, the weak acid is regenerated, and, when the absorbed sulphur dioxide is liberated subsequently, the salt of the weak acid is regenerated. Thus, the liberation of absorbed sulphur dioxide results in regeneration of the treating solution.

The above-described process of our invention is described and claimed in our co-pending application Serial No. 55,985 filed concurrently herewith.

The present invention is based on our discovery that greater and more rapid recovery of sulphur dioxide from solutions of salts of weak acids may be obtained by maintaining free weak acid in the absorption solutions.

Any suitable salt of a weak acid capable of reacting with sulphurous acid to produce a sulphite may be employed in carrying out the process of the invention. In accordance with the preferred process of the invention, the weak acid from which the salt is formed should be one which is stable and substantially non-volatile under the conditions employed in the absorption and sulphur dioxide liberation operations. (A process involving the use of salts of acids such as sulphurous acid is described and claimed in our co-pending application Serial No. 55,987 filed concurrently herewith.) Weak acids which decompose during the course of the operation and those which are highly volatile are not particularly suitable because decomposition or vaporization of a substantial amount of the acid would prevent effective regeneration of the absorption solution. The free weak acid maintained in the absorption solution should also be one which is stable and substantially non-volatile at the temperature employed in liberating the absorbed sulphur dioxide. In selecting the salt to be employed it is advisable to select a salt which is readily soluble in water, as the capacity of the solution for absorbing sulphur dioxide is substantially proportional to the concentration of salt in the solution. The weak acid from which the salt is formed may be either water-soluble or water-insoluble. The weak acid maintained in free or uncombined condition in the absorption solution should be soluble in the solution.

Salts of acids of the following types are suitable for use in carrying out the process of the invention: acetic, benzoic, chloroacetic, citric, fumaric, lactic, phosphoric, phthalic, salicylic, sulphanilic, and tartaric.

Any suitable salts of the above-identified acids may be employed for carrying out the process of the invention. We prefer to employ alkali metal and ammonium salts because of their availability and because such salts are usually soluble in water in effective amounts.

Acids of the type of the water-soluble acids of the above group may be maintained in the free or uncombined condition in the absorption solution. The free weak acid may be the same as that forming the salt or a different weak acid may be employed as the free acid. When the acid forming the salt is water-insoluble, a different, water-soluble acid should be employed as the free acid. In the preferred process of the invention, water-soluble salts of water-soluble weak acids are employed and the acid employed in the free or uncombined condition is the same as that forming the salt.

The following data show the effects of free weak acid upon the absorption of sulphur dioxide from gases containing about 6% sulphur dioxide by means of aqueous solutions of various salts of weak acids and containing free weak acid:

EXAMPLE I

*Solution containing ammonium sulphite without free weak acid and solutions containing ammonium sulphite and lactic acid*

| Grams of ammonium sulphite per liter | Grams of lactic acid per liter | Grams of SO₂ absorbed per liter | Percent SO₂ recovered on boiling for 10 minutes |
|---|---|---|---|
| 147 | None | 92 | 32 |
| 147 | 66 | 82 | 67 |
| 147 | 100 | 75 | 96 |
| 290 | 230 | 128 | 82 |
| 340 | 243 | 145 | 82 |
| 375 | 260 | 152 | 76 |
| 360 | 300 | 128 | 93 |

EXAMPLE II

*Solution containing ammonium lactate without free weak acid and solutions containing ammonium lactate and lactic acid*

| Grams of ammonium lactate per liter | Grams of lactic acid per liter | Grams of SO₂ absorbed per liter | Percent SO₂ recovered on boiling for 10 minutes |
|---|---|---|---|
| 675 | None | 151 | 52 |
| 606 | 106 | 218 | 75 |
| 524 | 213 | 178 | 96 |
| 600 | 450 | 136 | 79 |

EXAMPLE III

*Solution containing ammonium citrate without free weak acid and solution containing ammonium citrate and citric acid*

| Grams of ammonium citrate per liter | Grams of citric acid per liter | Grams of SO₂ absorbed per liter | Percent SO₂ recovered on boiling for 10 minutes |
|---|---|---|---|
| 600 | None | 204 | 80 |
| 445 | 150 | 191 | 82 |

In carrying out a process of the invention, the sulphur dioxide-bearing gases may be treated with the absorption solution in any manner known to the art of contacting gases and liquids. Thus, for example, the gases may be passed over the surface of a body of solution, with continuous or intermittent agitation of the solution, the gases may be bubbled through a body of the solution, or the gases and the solution may be passed, either co-currently or counter-currently, through a packed tower in contact with one another.

If gases such as roaster gases are being treated, they are preferably cooled and treated for the removal of dust and other objectionable impurities contained therein prior to treatment with the absorption solution.

The absorbed sulphur dioxide may be liberated in any suitable manner. Preferably, the solution is heated to a temperature sufficiently high to effect a rapid evolution of sulphur dioxide, but not high enough to cause substantial vaporization of the regenerated weak acid or the free weak acid employed in the absorption solution. Any suitable temperature from the absorption temperature to the boiling temperature of the solution may be employed, and the salt employed is preferably a salt of an acid which is substantially non-volatile at the temperature employed for liberation of the sulphur dioxide. The salt employed should also be one which forms a sulphite from which sulphur dioxide may be liberated readily under the influence of heat at temperatures above the absorption temperatures. Through careful selection of the salt and free weak acid employed optimum recovery of sulphur dioxide in a minimum period of time may be accomplished.

Rapid and effective liberation and recovery of sulphur dioxide may be accomplished by employing a free weak acid and a salt of a weak acid which are substantially non-volatile at the boiling temperature of the solution produced in the absorption operation and heating the solution to the boiling temperature.

Liberation of sulphur dioxide may be carried out at atmospheric pressure or at pressures below atmospheric. When the free weak acid or the acid from which the salt employed is formed is volatile at the boiling point of the solution produced in the absorption operation, liberation of the sulphur dioxide should be carried out at a temperature below the boiling point of the solution.

The absorption operation normally may be carried out satisfactorily at or near normal atmospheric temperature. The absorption operation may also be carried out at the highest temperature at which sulphite formation will proceed satisfactorily. The temperature for the absorption operation should be determined by the rate of production of sulphite and the solubility of the particular salt selected at various temperatures.

The apparatus employed in carrying out a process of the invention should be so arranged that available heat may be utilized efficiently. Thus, for example, when hot roaster gases are being treated, the heat contained in the gases should be utilized for heating the sulphite solution from which sulphur dioxide is to be liberated, and the cold sulphite solution produced in the absorption operation should be utilized for cooling the regenerated absorption solution to the desired temperature, after liberation of the sulphur dioxide, to avoid wasting the heat contained therein.

Heating of the sulphite solution for the purpose of liberating sulphur dioxide may be carried out in any suitable manner. For example, the solution may be heated in a closed receptacle out of contact with other gases, or the solution may be heated by contact with a body or stream of another gas to which it is desired to transfer the sulphur dioxide.

The gaseous product formed by heating the sulphite solution in a closed receptacle out of contact with other gases is substantially pure sulphur dioxide and it may be utilized for a suitable industrial purpose directly (diluted or undiluted) or it may be cooled to a suitable temperature and compressed to form liquid sulphur dioxide.

We claim:
1. The process for recovering sulphur dioxide from gases containing the same which comprises treating the gases with an aqueous liquid containing in solution a free weak acid and a salt of a weak acid capable of reacting with sulphurous acid to regenerate the weak acid and produce a sulphite which decomposes under the influence of heat with the liberation of sulphur dioxide, and heating the resulting solution to liberate sulphur dioxide, the free weak acid and the acid forming the salt being stable and substantially non-volatile at the temperature employed for liberating the sulphur dioxide, and the free weak acid being employed in an amount not less than that equivalent to about 68 grams of lactic acid per liter and sufficient to effect a material increase in the rate of liberation of sulphur dioxide from the absorption solution at its boiling temperature as compared with the rate of liberation of sulphur dioxide at the boiling temperature from a similar absorption solution containing no free weak acid.

2. The process for recovering sulphur dioxide from gases containing the same which comprises treating the gases with an aqueous liquid containing in solution a weak acid and a salt of a water-soluble weak acid capable of reacting with sulphurous acid to regenerate the water-soluble weak acid and produce a sulphite which decomposes under the influence of heat with the liberation of sulphur dioxide, and heating the resulting solution to liberate sulphur dioxide, the free weak acid and the acid forming the salt being stable and substantially non-volatile at the temperature employed for liberating the sulphur dioxide, and the free weak acid being employed in an amount not less than that equivalent to about 68 grams of lactic acid per liter and sufficient to effect a material increase in the rate of liberation of sulphur dioxide from the absorption solution at its boiling temperature as compared with the rate of liberation of sulphur dioxide at the boiling temperature from a similar absorption solution containing no free weak acid.

3. The process for recovering sulphur dioxide from gases containing the same which comprises treating the gases with an aqueous liquid containing in solution a free weak acid and a salt of a water-insoluble weak acid capable of reacting with sulphurous acid to regenerate the water-insoluble weak acid and produce a sulphite from which sulphur dioxide may be liberated by heating, and heating the resulting solution to liberate sulphur dioxide, the free weak acid and the water-insoluble acid being stable and substantially non-volatile at the temperature employed for liberating the sulphur dioxide, and the free weak acid being employed in an amount not less than that equivalent to about 68 grams of lactic acid per liter and sufficient to effect a material increase in the rate of liberation of sulphur dioxide from the absorption solution at its boiling temperature as compared with the rate of liberation of sulphur dioxide at the boiling temperature from a similar absorption solution containing no free weak acid.

RAYMOND F. BACON.
ROCCO FANELLI.